March 29, 1960 J. H. BENT 2,930,262
ANGLE ATTACHMENT FOR DRILLS
Filed May 17, 1957 4 Sheets-Sheet 1
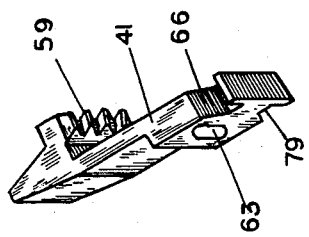
FIG.2
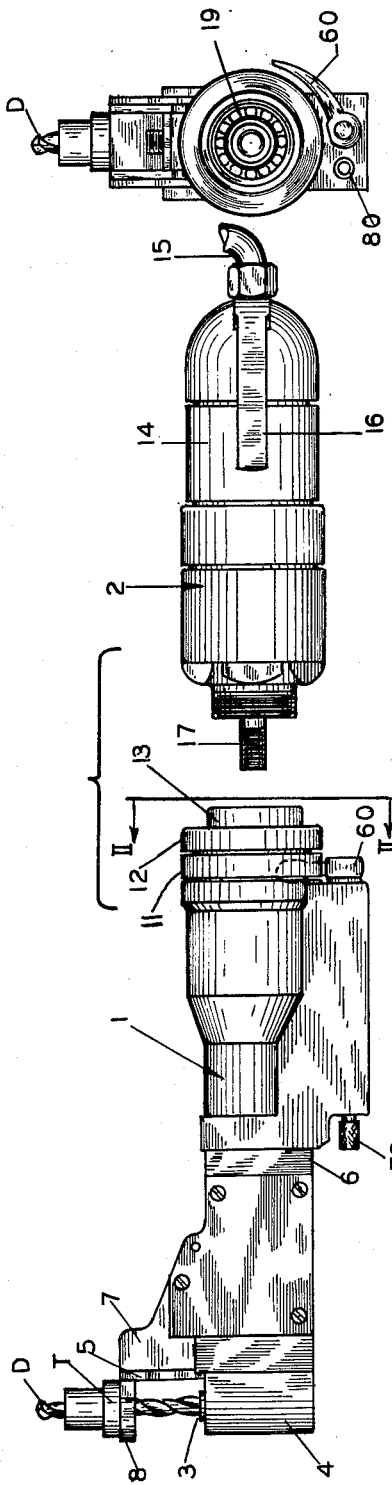
FIG.1.
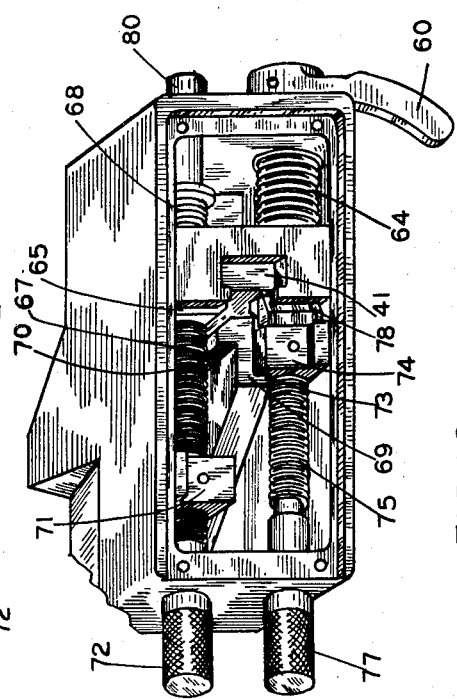
FIG.9.
FIG.10.
INVENTOR:
JOHN H. BENT
BY
Charles W. Walton
ATTORNEY

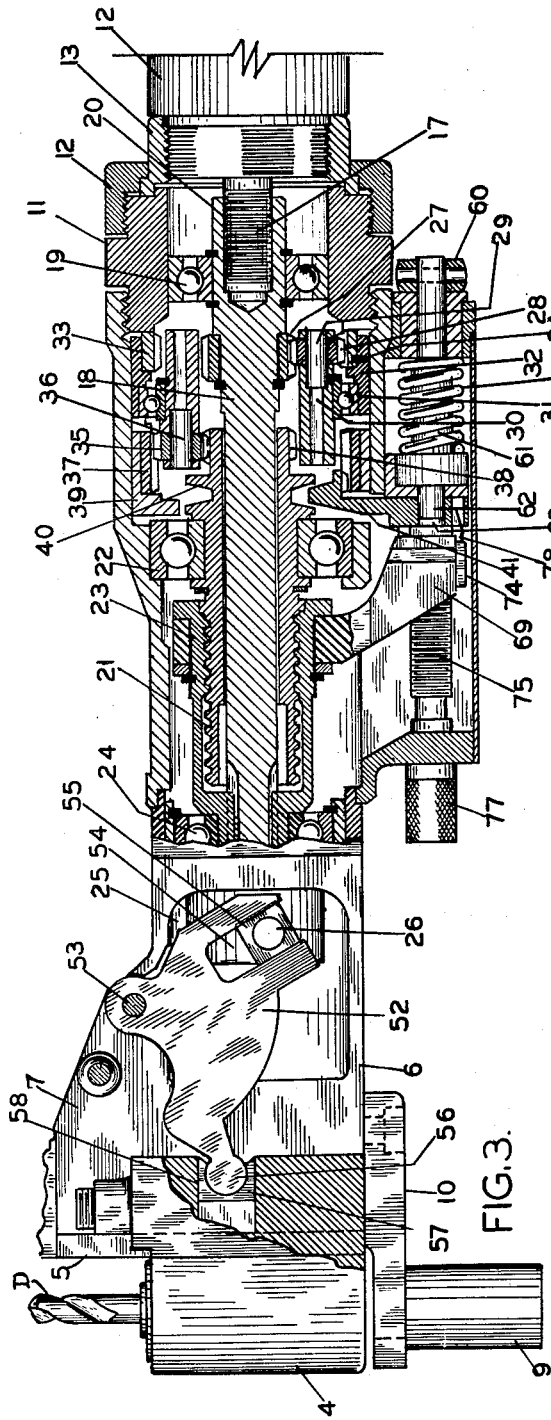

March 29, 1960 J. H. BENT 2,930,262
ANGLE ATTACHMENT FOR DRILLS
Filed May 17, 1957 4 Sheets-Sheet 3

INVENTOR:
JOHN H. BENT
BY
Charles W. Helm
ATTORNEY

March 29, 1960 J. H. BENT 2,930,262
ANGLE ATTACHMENT FOR DRILLS
Filed May 17, 1957 4 Sheets-Sheet 4

INVENTOR:
JOHN H. BENT
BY
Charles W. Walton
ATTORNEY

United States Patent Office 2,930,262
Patented Mar. 29, 1960

2,930,262
ANGLE ATTACHMENT FOR DRILLS

John H. Bent, North Hollywood, Calif., assignor to Gardner-Denver Company, Quincy, Ill., a corporation of Delaware Application May 17, 1957, Serial No. 659,856

13 Claims. (Cl. 77—34.4)

This invention relates generally to tools of the type intended for performing drilling and similar operations and more particularly to a device for advancing and retracting a rotatable cutting element with respect to a work piece.

It is the general object of this invention to provide a device for positively feeding and retracting a cutting element in obstructed areas where an angle drill would normally be used.

A further and more specific object of this invention is to provide a device for positively feeding and retracting a cutting element transversely of the axis of the power transmission mechanism which may be attached to a rotary driver.

A still further object is to provide an improved power transmission mechanism for rotating, feeding and retracting a cutting element at right angles to the axis of said power transmission mechanism wherein actuation of the mechanism positively advances the rotating cutting element, automatically retracts the cutting element, and automatically interrupts the application of power for effecting lineal movement of said cutting element at the end of the return stroke.

Further objects and advantages of this invention will become apparent from the following specification and by reference to the accompanying drawings in which:

Fig. 1 is a partially exploded side elevational view of a device for positively feeding and retracting a cutting element embodying the features of this invention for use with a rotary driver such as a hand drill as shown;

Fig. 2 is an end view of the drill attachment of Fig. 1 taken on the line II—II of Fig. 1;

Fig. 3 is a partial central longitudinal section through backstop 9 and bracket 10 attached illustrating the head feeding mechanism and the component relationship for feed condition of operation;

Fig. 4 is a bottom plan view, partly in section, showing the control elements of the device in the feed condition backstop 9 and bracket 10 removed;

Fig. 5 is a full central longitudinal sectional view of the device showing component relationship for return condition of operation;

Fig. 6 is a bottom plan view, partially in section showing the control elements of the device in the return condition of operation shown in Fig. 5;

Fig. 9 is a perspective view of the locking segment which determines the feeding, retracting and neutral conditions of operation; and Fig. 10 is a perspective view of the control elements shown in Figs. 4, 6 and 8.

Figure 7:
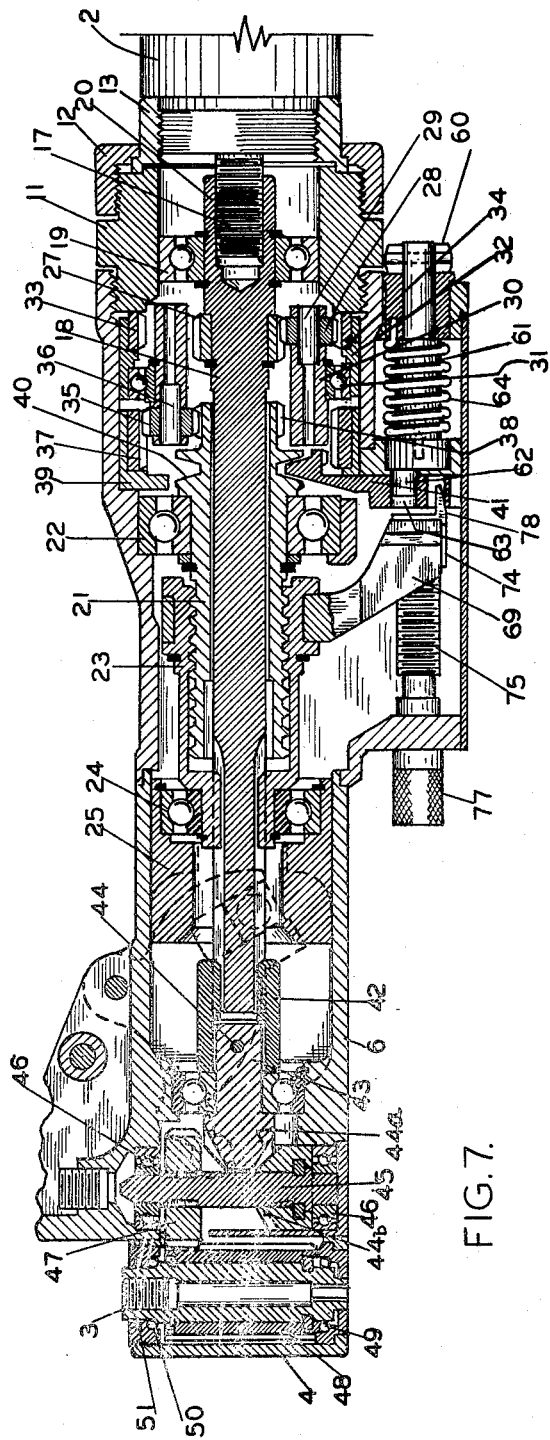
Fig. 7 is a sectional view similar to Fig. 5 but showing component relationship in neutral condition.
Figure 8:
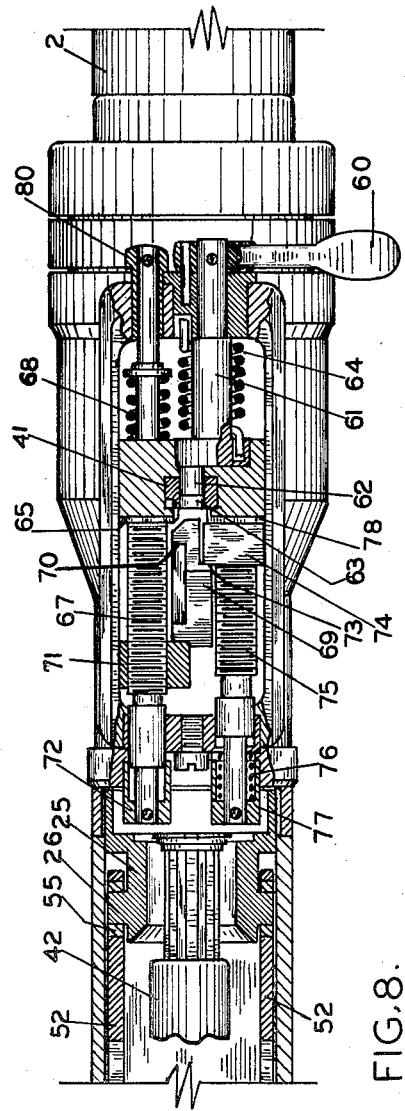
Fig. 8 is a bottom plan view, partly in section showing the control elements of the device in the neutral condition shown in Fig. 7.

While the invention herein is susceptible of various modifications and alternative constructions, there is herein shown and described a preferred embodiment. However, it is not intended that the invention be limited to this specific embodiment but rather it is intended to cover within the scope of the appended claims, modifications and alternative constructions falling within the scope of the invention.

In modern day industrial plants portable or hand-held tools play an important role in many applications. These tools are particularly useful in fields where production is so limited or design changes are so numerous that the use of special purpose machine tools is impractical. This is particularly true in the aircraft industry wherein the practice has been adopted of using portable self-contained tools for performing drilling and allied operations in conjunction with readily fabricated and alterable jigs and fixtures.

Portable tools for advancing and retracting a spindle have been commercially successful for a number of years, however, most of the tools heretofore designed are elongated devices requiring considerable clearance above the work piece in order to be operated. Often, the holes to be drilled are in obstructed areas where a right angled drill would normally be used. Heretofore self-feeding right angled drills have not been available. The invention herein described provides a right-angled drill of the self-feeding type to drill in such obstructed areas.

Referring to the drawings, there is shown a device for feeding and retracting a rotatable cutting element such as a drill bit which uses the spindle of a power operated hand tool as a driver. The illustrated device is in the form of an attachment 1 to be mounted on the forward end of a hand-drill 2.

The attachment 1 is equipped with a spindle 3 adapted to receive a drill D of the threaded shank type. The spindle 3 is contained within a head 4 carried on a pair of transverse ways 5 attached to a main housing 6. The axis of the spindle 3 is at right angles to the longitudinal axis of the housing 6. Rigidly fixed to the housing is a support bracket 7 which supports a stationary nose piece 8 within which the drill D rotates and reciprocates. The nose piece 8 is adapted to receive at the outer or forward end thereof a suitable drill bushing tip T to permit the entire device to be attached to and supported upon a jig or fixture as may be required for use for the particular job to be accomplished. In some applications it may be desirable to absorb the reaction to the thrust of the drill on a surface opposite the hole to be drilled. Accordingly a backstop 9 (Fig. 3) received in a bracket 10 attached to the main housing 6 of the device may be used to reach the nearest surface opposite the hole to be drilled thus eliminating the use of a drill bushing tip T.

At its rear end the main housing 6 terminates in an adapter 11 which, as shown, may be screw threaded into the rear end of the main housing 6 and by means of a suitable lock nut 12 and a suitable flange nut 13, the adapter may be connected to the forward end portion of the hand drill 2.

The hand drill 2, here chosen for purposes of illustration, is of the pneumatic actuated type and includes a body 14 which encloses a suitable rotary, pressure fluide operated motor. Pressure fluid is supplied to the hand drill 2 through a hose 15. A throttle lever 16 actuates a valve to control the supply of pressure fluid to the tool. Output power is delivered by the hand drill 2 by way of a forwardly projecting spindle 17, here shown as externally threaded.

Within the main housing 6 is a drive shaft 18 rotatably mounted in an anti-friction bearing 19 supported within the adapter 11. At its rear end the drive shaft 18 is provided with a bore 20 which is internally threaded to receive the outer end of the spindle 17 of the hand drill 2.

Surrounding the drive shaft 18 and coaxial therewith is an externally threaded feed or lead screw sleeve 21 journaled in an anti-friction bearing 22 supported by the main housing 6 so that the lead screw and the drive shaft may rotate independently of each other.

A lead screw nut 23 having bores of enlarged and reduced diameters is positioned on the drive shaft 18 and the forward portion of the lead screw 21. The enlarged bore of the lead screw nut is suitably threaded to engage the external threads of the lead screw 21. The reduced bore of the lead screw nut is splined to engage complemental external splines formed on a reduced extension of the drive shaft 18. Accordingly the lead screw nut is non-rotatively connected to the drive shaft yet is mounted for longitudinal movement with respect thereto. The lead screw nut 23 is rotatably supported in an anti-friction bearing 24 which is mounted in a trunnion slide element 25 within the main housing 6. The trunnion slide element is slidable longitudinally in the main housing 6 but does not rotate therein. The trunnion slide element 25 includes a pair of projecting bosses 26 which serve to connect the trunnion slide element to the head 4 as hereinafter described.

Interposed between the drive shaft 18 and the lead screw 21 is a power transmission system which comprises first and second planetary gear trains, arranged in back-to-back relation with the planetary gear elements of each mounted for rotation on a common gear cage or carrier. As shown, the transmission includes a first or driving terminal gear 27 keyed directly to the drive shaft 18 and which meshes with planetary gear elements 28 disposed about the same. The planetary gear elements 28 are rotatably mounted on stub shafts 29 supported adjacent the rear end of a gear cage or carrier 30 which is rotatably supported in an anti-friction bearing 31 within a bushing 32 fixed to the housing 6. The planetary gear elements 28 rotate within a ring gear 33 which is non-rotatively held within the main housing 6 by means of a pin 34. At the forward end of the carrier 30 planetary gear elements 35 of the second gear train are supported on stub shafts 36, which shafts are also supported by the carrier 30. The planetary gear elements 35 rotate within a ring gear 37 and mesh with a second or driven terminal gear 38 formed on the rear end of the lead screw 21.

It will be apparent that rotation of the first terminal drive gear 27, so as to effect rotation of the planetary gears 28 within the fixed ring gear 33 results in rotation of the carrier 30. With the ring gear 37 of the second gear train held stationary, the planetary gears 35 will be caused to rotate because of their mounting upon the carrier 30. As a result the lead screw 21 is rotated by means of the planetary gears 35 which mesh with the driven terminal gear 38 on the lead screw. The change speed ratios of the two planetary gear trains are so chosen that under the foregoing conditions the lead screw 21 is rotated at a speed somewhat greater than the speed of rotation of the drive shaft 18 and in the same direction. Since the lead screw nut 23 is directly coupled to the drive shaft 18, the lead screw nut is rotated at a speed somewhat less than the speed of rotation of the lead screw 21. With the thread of the lead screw 21 and the lead screw nut 23 properly chosen with respect to the direction of rotation of the drive shaft 18, the rotational speed differential between the screw and the shaft under these conditions results in forward or feeding movement of the nut 23 with respect to the screw 21. Thus the trunnion slide element 25 is fed forwardly.

To effect return movement of the trunnion slide element 25, the transmission is constructed and arranged to restrain rotation of the lead screw 21 so that it will rotate at a speed that will be less than the speed of rotation at which the lead screw nut 23 is driven by the drive shaft 18. To this end, in the illustrative embodiment, the second planetary gear train is constructed and arranged so that in return condition of operation the transmission of driving force is interrupted. For this purpose the ring gear 37 is adapted to be released to rotate freely. As shown, the ring gear 37 is concentrically and rotatably mounted within a bushing 39 fixed within the main housing 6.

It will be apparent that, when released for rotation within the bushing 39, the ring gear 37 is rotated by the planetary gear elements 35 as the latter are driven by the first gear train. Since the ring gear is free to rotate, no driving force is imparted to the lead screw 21. Because of friction, however, there may be a tendency for the lead screw 21 to rotate. In order to restrain such movement, the lead screw 21 is provided with a conical groove 40 about its periphery in which a complementary shaped locking segment 41 is receivable to frictionally engage the groove 40 to slow or stop the rotation of the lead screw. Thus, with the ring gear 37 free to rotate so that no driving force is imparted to the lead screw 21, and with rotational movement of the lead screw 21 restrained by frictional engagement with the locking segment 41, rotation of the lead screw nut 23 is effected at a speed greater than that of the lead screw 21. The lead screw nut 23 is thereby retracted over the lead screw so as to effect retraction or return movement of the trunnion slide element 25.

The rotatable spindle 3 within the head 4 is rotated by a mechanism hereinafter described. The forward end of the drive shaft 18 is directly coupled, by a coupling 42 having internal splines which engage the external splines at the forward end of the drive shaft, to the rear end of a shaft 43. A transverse pin 44 through the coupling 42 and the shaft 43 prevents relative rotation therebetween. A bevel gear 44a formed on the forward end of shaft 43 engages a bevel gear 44b which is non-rotatively mounted on an intermediate shaft 45 adjacent one end thereof. The intermediate shaft 45 is mounted, with its longitudinal axis at right angles to the axis of the drive shaft 18 and shaft 43, in anti-friction bearings 46 supported within the main housing 6. A portion of intermediate shaft 45 is formed to provide a hexagonal periphery on which a spur gear 47 having a hexagonal hole therethrough is non-rotatively mounted. The spur gear 47 meshes with an elongated gear 48 which is non-rotatively connected to the spindle 3. The spindle 3 rotates within an anti-friction bearing 49 supported by the head 4 and an anti-friction bearing 50 supported in the head cap 51. The head cap 51 is provided with external threads which engage internal threads in the head 4. Thus rotation of the drive shaft 18 is transmitted to the spindle 3 to rotate the drill D.

The rotatable spindle 3 is fed and retracted with respect to a work piece by a mechanism hereinafter described. The trunnion slide element 25 is operatively connected to the head 4 by means of a pair of bell-crank levers 52 (Fig. 3). The bell-cranks 52 are pivotally connected to the main housing by a pin 53. One end of each bell-crank is provided with a slot 54 in which a trunnion block 55 is slidably received. The trunnion blocks 55 are provided with bores to receive the projecting bosses 26 of the trunnion slide element 25. The opposite ends of the bell-cranks are provided with ball-type projections 56 which are receivable in bearing blocks 57 carried in slots 58 on each side of the head 4. This arrangement serves to transmit feeding and retracting movements of the trunnion slide element 25 to the head 4 so as to advance and retract the head 4 on transverse ways 5 thereby to advance and retract the spindle 3 and drill D towards and away from a work piece.

In order to effect feeding and retracting movements of the spindle 3, of the illustrative embodiment, it is necessary to hold and release the ring gear 37 and to release and impede the lead screw 21. The locking segment 41 which in one extreme position frictionally engages the lead screw 21 also serves to hold ring gear 37 against rotation in the other extreme position of the locking segment. Accordingly, locking segment 41 is provided with spur teeth 59 (Fig. 9) adapted to engage the internal teeth of the ring gear 37. The locking segment 41 is mounted within the housing 6 for sliding motion radially inward to frictionally engage the lead screw 21 and radially outward to engage the teeth of ring gear 37. Between these two positions the locking segment 41 is in a neutral position engaging neither the lead screw 21 nor the ring gear 37. The locking segment 41 is controlled by an operating lever 60 which rotates a shaft 61 which carries an eccentric pin 62 which in turn is received in a slot 63 in locking segment 41. A torsion spring 64 surrounding the shaft 61 normally holds the locking segment 41 in frictional engagement with lead screw 21 which is the position for retraction of the spindle. To effect a feeding movement of the spindle 3, the operating lever 60 is manually depressed which causes the locking segment 41 to engage the ring gear 37. The locking segment 41 is held in this position during feeding of the spindle 3 by a latching element 65 which engages a notch 66 in the locking segment 41. The latching element 65 is carried on a threaded feed control rod 67 supported by the housing 6 for limited longitudinal movement and which is biased rearwardly by a compression spring 68. As locking segment 41 is positioned by operating lever 60 for feeding motion of the spindle the latching element 65 enters the notch 66 and is held in this position by the force of the spring 68 until released.

The length of the forward stroke of the spindle, automatic return of the spindle, and stopping of lineal motion is controlled by a feed control dog 69 rotatably carried by the lead screw nut 23. As shown, feed control dog 69 has a projection 70 which is engageable with an internally threaded adjustable forward stop 71 on feed control rod 67. The forward stop 71 may be manually positioned on feed control rod 67 by a feed control knob 72 which rotates the threaded feed control rod 67. When the feed control dog 69 engages stop 71 feed control rod 67 is moved forward longitudinally against the rearward pressure of spring 68 moving the latching element 65 forward to release locking segment 41. Torsion spring 64 then causes the locking segment 41 to shift to release ring gear 37 for rotation and to frictionally engage feed screw 21 whereby to cause spindle 3 to retract.

As feed control dog 69 moves rearwardly during the retracting movement of the spindle, a projection 73 on the feed control dog eventually engages an adjustable rearward stop 74 carried by a threaded return control rod 75. The return control rod is supported by the housing 6 for limited longitudinal movement and is biased forwardly by a compression spring 76. The rearward stop 74 may be manually positioned on the return control rod 75 by a return control knob 77 which rotates the threaded feed control rod 75. When feed control dog 69 engages rearward stop 74, return control rod 75 is moved rearward. A tapered latch element 78 carried at the rear end of the control rod 75 enters an enlarged notch 79 in locking segment 41. The tapered latch 73 entering the notch 79 causes the locking segment to move radially outward against the pressure of torsion spring 64 moving the locking segment out of engagement with lead screw 21. The latch 78 holds the locking segment in this neutral position where it engages neither the ring gear 37 nor the lead screw 21. The lead screw 21 then idles at approximately the same speed as drive shaft 18 and no feed or return motion occurs.

When operating lever 60 is again depressed and the feed cycle is started again, the enlarged notch 79 is of sufficient size to allow locking segment 41 to again engage ring gear 37. As feed control dog 69 moves forward, rearward stop 74 is released and compression spring 76 returns the return control rod 75, rearward stop 74 and tapered latch element 78 to their original positions.

An emergency release button 80 is provided to stop the feeding motion of the spindle in the event of drill breakage, accident or other emergency. The button 80 is attached to an extension of feed control rod 67 so that manually depressing the button 80 moves feed control rod 67 forward against the pressure of spring 68 thereby moving latching element 65 forward to release locking segment 41. Torsion spring 64 will cause locking segment 41 to shift to retract the spindle 3. When fully retracted the tool will idle as hereinbefore described until the source of fluid pressure to the tool is shut-off or the operating lever is again depressed.

The control elements hereinbefore described are merely illustrative of one method of automatically controlling the lineal movement of the spindle through one complete cycle. Other automatic controls and even manual controls could be used with the operating structure described.

It will be apparent from the foregoing that a device constructed in accordance with the teachings of the present invention is readily adaptable for use with any rotary driver whether pneumatically, electrically or otherwise driven and particularly for use with a hand tool such as a drill. By means thereof a cutting element such as a drill bit can be fed toward a work piece at a rate and thrust as predetermined by the ratios of the gearing included in the transmission in conjunction with the pitch of the threads of the lead screw and the lead screw nut.

It will also be apparent that the means for translating rotary and lineal movement through an angle of 90 degrees as taught by the present invention may be adapted to other tools having rotating and reciprocating elements. For example, the corresponding application of John H. Bent (Serial No. 626,776 filed December 6, 1956), shows a drilling tool having a double planetary gear type of transmission wherein the lead screw sleeve is held stationary and the lead screw advances and retracts. The copending application of Claude L. Robinson and Robert B. Shulters (Serial No. 596,940 filed July 10, 1956), discloses an attachment for rotary drivers for feeding and retracting a rotatable drill axially of the drive shaft and using a power transmission similar to that of the Bent application. The patent to Taylor (No. 2,674,098 issued April 6, 1954), shows a drilling tool having a rotatable spindle which is fed and retracted pneumatically. A right angle drive similar to that shown in the present invention can be readily incorporated in any of these devices and many similar tools without departing from the spirit or scope of the invention as claimed.

I claim as my invention:

1. A power-operated spindle rotating and feeding device for attachment to a rotary driver comprising in combination: a housing; a drive shaft journaled in said housing for direct connection to said driver; a feed screw journaled in said housing about a portion of the length of said drive shaft; a feed screw nut engaged with said feed screw and splined to said drive shaft; a slidable head carried by said housing adapted for reciprocation transversely of the axis of said drive shaft; a spindle journaled within said head; means operatively connecting said spindle with said drive shaft including bevel gears and an intermediate geared shaft; means including a bell-crank connecting said feed screw nut and said head for translating longitudinal movement of said feed screw nut into transverse movement of said head; means including change speed gearing for driving said feed screw from said shaft; and a clutch for operating said driving means, having one position for rendering said driving means effective to drive said feed screw and having another position for impeding rotation of said feed screw.

2. A power-operated spindle rotating and feeding device for attachment to a rotary driver comprising in combination: a housing; a drive shaft journaled in said housing for direct connection to said driver; a feed screw also journaled in said housing; a feed screw nut engaging said feed screw and splined to said drive shaft; a slidable head carried by said housing adapted for reciprocation transversely of the axis of said drive shaft; a rotatable spindle journaled in said head and adapted to be driven by said drive shaft; a bell-crank connecting said feed screw nut and said head whereby longitudinal movement of said feed screw nut is translated into transverse movement of said head; a geared connection between said shaft and said feed screw for driving said feed screw at a rotational speed in excess of the rotational speed of said shaft to advance said feed screw nut longitudinally; and means for rendering said geared connection ineffective and simultaneously impeding rotation of said feed screw to retract said feed screw nut.

3. A power-operated spindle rotating and feeding device for attachment to a rotary driver comprising in combination: a housing; a drive shaft journaled in said housing for direct connection to said driver; a feed screw also journaled within said housing; a feed screw nut engaged with said feed screw and splined to said drive shaft; means for driving said feed screw selectively at rotational speeds faster and slower than the rotational speed of said drive shaft to advance and retract said feed screw nut; a rotatable spindle driven by said drive shaft, the axis of said spindle being at an angle to the axis of said drive shaft; and means connected to said feed screw nut for advancing and retracting said spindle.

4. A power-operated spindle rotating and feeding device for attachment to a rotary driver comprising in combination: a housing; a drive shaft journaled in said housing for direct connection to said driver; a slidable head carried by said housing for reciprocation transversely of the axis of said drive shaft; a rotatable spindle journaled in said head and driven by said drive shaft; a bell-crank pivoted to the housing and having, at one end, a connection to said head and, at the other end, a connection to a trunnion slide within said housing; screw means for advancing and retracting said trunnion slide; and change speed gearing driven from said drive shaft for operating said screw means.

5. A power-operated spindle rotating and feeding device for attachment to a rotary driver comprising in combination: a housing; a drive shaft journaled in said housing for direct connection to said driver; a slidable head carried by said housing for reciprocation transversely of the axis of said drive shaft; a rotatable spindle journaled in said head and driven by said drive shaft; a member movable longitudinally in said housing; screw means for advancing and retracting said member; means connecting said member and said head for converting longitudinal movement of said member to transverse movement of said head; and change speed gearing driven from said drive shaft for operating said screw means.

6. A portable drilling tool for rotating and feeding a cutting element, comprising in combination: a housing; a rotary motor; a drive shaft within said housing driven by said motor; a feed screw within said housing; a feed screw nut engaged with said feed screw and splined to said drive shaft; a driving connection including change-speed gearing driven by said drive shaft for driving said feed screw, at a rotational speed in excess of the rotational speed of said feed screw nut, to advance said feed screw nut; clutch means for disabling said driving connection and impeding rotation of said feed screw sleeve to retract said feed screw nut; a slidable head carried by said housing for reciprocation transversely of the axis of said drive shaft; a spindle journaled within said head and adapted to receive a cutting element; a driving connection between said drive shaft and said spindle; and means including a bell-crank connecting said feed screw nut and said head to advance and retract said head transversely of the axis of said drive shaft.

7. A portable drilling tool for feeding and retracting a rotatable cutting element comprising in combination: a housing; a rotary motor; a drive shaft driven by said motor; a feed screw; a feed screw nut splined to said drive shaft and engaging said feed screw; means for driving said feed screw selectively at rotational speeds faster and slower than the rotational speed of said drive shaft to advance and retract said feed screw nut; a rotatable spindle driven by said drive shaft and adapted to receive a cutting element, the axis of said spindle being at right angles to the axis of said drive shaft; and means including a bell-crank pivoted to said housing and connecting said feed screw nut and said spindle for advancing and retracting said cutting element transversely of the axis of said drive shaft.

8. A portable drilling tool for feeding and retracting a rotatable cutting element comprising in combination: a housing; a rotary motor; a drive shaft driven by said motor; a rotatable spindle driven by said drive shaft and adapted to receive a cutting element, said spindle being at right angles to the axis of said drive shaft and being mounted for movement transversely of the axis of said drive shaft; means including a bell-crank connecting said spindle to a slidable element within said housing; screw means for advancing and retracting said slidable element; and means including change speed gearing driven from said drive shaft for operating said screw means.

9. A power-operated spindle rotating and feeding device for attachment to a rotary driver comprising in combination: a housing; a drive shaft journaled in said housing for direct connection to said driver; a feed screw also journaled within said housing; a feed screw nut engaged with said feed screw and splined to said drive shaft; means for driving said feed screw selectively at rotational speeds faster and slower than the rotational speed of said drive shaft whereby to advance and retract said feed screw nut; a rotatable spindle driven by said drive shaft, the axis of said spindle being at an angle to the axis of said drive shaft; means connected to said feed screw nut for advancing and retracting said spindle; said driving means including a clutch member adapted, in one position, to render said driving means effective and, in another position, to render said drive means ineffective and to impede rotation of said feed screw; means for locking said clutch member in one of said positions; a dog rotatably carried by said feed screw nut for movement therewith; and means associated with said dog for shifting said clutch member to the other of said positions and for subsequently shifting said clutch member to an intermediate position.

10. In a power operated spindle rotating and feeding device: a housing; a spindle; a drive shaft journaled in said housing for driving said spindle; a first threaded sleeve journaled in said housing about a portion of the length of said drive shaft; a second threaded sleeve engaged with said first sleeve and splined to said drive shaft for longitudinal movement with respect thereto to reciprocate said spindle; a planetary gear system coupling said first sleeve to said drive shaft; said system having a ring gear mounted for rotation within said housing; a reciprocable clutch member adapted in one position thereof to engage and lock said ring gear, in another position thereof to frictionally engage said first sleeve, and having an intermediate position; a dog rotatably mounted on said second sleeve for longitudinal movement therewith; and means associated with said dog to shift the position of said clutch member in accordance with longitudinal positions of said second sleeve.

11. An angle drilling unit for a self-feeding drill including a drive shaft and a reciprocating drill feeding element: said drilling unit comprising a housing for attachment to said drill; an intermediate shaft journaled in said housing about an axis transverse to the axis of said drive shaft; a bevel gear and spur gear fixed to said intermediate shaft; said bevel gear being disposed to be driven by said drive shaft; a head mounted on said housing for reciprocating movement parallel to said intermediate shaft; a spindle journaled within said head and adapted to receive a cutting element; an elongated gear fixed to said spindle for engagement with said spur gear; and a bell-crank pivotally mounted in said housing, being connected at one end to said head and adapted for connection at its other end to said drill feeding element.

12. An angle drilling unit for a self-feeding drill including a drive shaft and a reciprocating drill feeding element: said drilling unit comprising a housing for attachment to said drill; a head slidably carried by said housing for reciprocating movement in a direction transverse to the axis of said drive shaft; a rotatable spindle in said head adapted to receive a cutting element; gear means for driving said spindle including a bevel gear to be driven by said drive shaft; and means including a bell-crank associated with said head for connection to said drill feeding element.

13. A power-operated spindle rotating and feeding device for a rotary driver comprising in combination: a housing; a drive shaft in said housing for connection to said driver, a first threaded element rotatably mounted in said housing; clutch drive means connecting said drive shaft and said first element; a second threaded element rotated by said drive shaft and coacting with said first element for axial movement with respect to said drive shaft; a sliding head carried by said housing for movement in a direction transverse to the axis of said drive shaft; means connecting said second element and said head for converting axial movement of said second element into transverse movement of said head; and automatic means for actuating said clutch drive means to control the transverse movement of said head.

References Cited in the file of this patent
UNITED STATES PATENTS 2,796,767     Carpenter _____ June 25, 1957